(12) United States Patent
Abe et al.

(10) Patent No.: US 11,558,190 B2
(45) Date of Patent: Jan. 17, 2023

(54) USING KEYS FOR SELECTIVELY PREVENTING EXECUTION OF COMMANDS ON A DEVICE

(71) Applicant: International Business Machines Corporation, Armonk, NY (US)

(72) Inventors: Atsushi Abe, Ebina (JP); Yuka Sasaki, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 17/114,023

(22) Filed: Dec. 7, 2020

(65) Prior Publication Data

US 2022/0182224 A1   Jun. 9, 2022

(51) Int. Cl.
  *H04L 9/08*  (2006.01)
(52) U.S. Cl.
  CPC ............ *H04L 9/088* (2013.01); *H04L 9/0825* (2013.01); *H04L 9/0891* (2013.01); *H04L 9/0894* (2013.01)
(58) Field of Classification Search
  CPC ..... H04L 9/088; H04L 9/0825; H04L 9/0891; H04L 9/0894
  USPC ....................................................... 380/277
  See application file for complete search history.

(56) References Cited

U.S. PATENT DOCUMENTS

| | | | |
|---|---|---|---|
| 2008/0205651 A1* | 8/2008 | Goto | G06F 21/71 713/189 |
| 2014/0032932 A1 | 1/2014 | Hiar et al. | |
| 2014/0089667 A1 | 3/2014 | Arthur, Jr. et al. | |
| 2016/0085992 A1 | 3/2016 | Boivie et al. | |
| 2017/0006003 A1* | 1/2017 | Zakaria | H04L 63/0442 |
| 2017/0279784 A1* | 9/2017 | Kent | H04L 9/3265 |
| 2018/0351945 A1* | 12/2018 | Li | H04W 8/205 |
| 2020/0210600 A1 | 7/2020 | Peng et al. | |
| 2020/0348361 A1* | 11/2020 | Kurts | H04L 9/0894 |
| 2021/0377044 A1* | 12/2021 | Leibmann | H04L 9/0891 |
| 2022/0038275 A1* | 2/2022 | Hwang | G06F 21/78 |

* cited by examiner

*Primary Examiner* — Kambiz Zand
*Assistant Examiner* — Phuc Pham
(74) *Attorney, Agent, or Firm* — Zilka-Kotab, P.C.

(57) ABSTRACT

A computer-implemented method according to one embodiment includes receiving, at a first system, a command to start encryption. In response to receiving the command to start encryption, a pair of keys are created on the first system. The pair of keys includes a public key and a secret key. The method further includes outputting the public key to a second system and saving the secret key on the first system. A command encrypted using the public key is received by the first system. The encrypted command is decrypted on the first system using the secret key and the decrypted command is executed. A computer program product according to another embodiment includes a computer readable storage medium having program instructions embodied therewith. The program instructions are readable and/or executable by a computer to cause the computer to perform the foregoing method.

18 Claims, 4 Drawing Sheets

USING KEYS FOR SELECTIVELY PREVENTING EXECUTION OF COMMANDS ON A DEVICE

BACKGROUND

The present invention relates to command execution, and more specifically, this invention relates to using keys for selectively preventing execution of commands on a device.

In order to ensure that information exchanged between two locations in a computing environment remains secure from being accessed by unauthorized devices, the information is often encrypted. For example, some information may be secured using cryptography. Cryptography implements a key to determine a functional output of an algorithm that is used for encrypting as well as decrypting the information.

SUMMARY

A computer-implemented method according to one embodiment includes receiving, at a first system, a command to start encryption. In response to receiving the command to start encryption, a pair of keys are created on the first system. The pair of keys includes a public key and a secret key. The method further includes outputting the public key to a second system and saving the secret key on the first system. A command encrypted using the public key is received by the first system. The encrypted command is decrypted on the first system using the secret key and the decrypted command is executed.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using a public key and a secret key for selectively preventing execution of commands on a device. Particularly, various embodiments implement a public key to encrypt commands from a third party, for entry into a client for submission to a server in a client-server configuration. By encrypting the command, a user entering the command into a client cannot understand the command. Moreover, the server discards the secret key used to decrypt the encrypted command, thereby rendering the encrypted command unreadable if entered by said user via the client at a later time.

In one general embodiment, a computer-implemented method includes receiving, at a first system, a command to start encryption. In response to receiving the command to start encryption, a pair of keys are created on the first system. The pair of keys includes a public key and a secret key. The method further includes outputting the public key to a second system and saving the secret key on the first system. A command encrypted using the public key is received by the first system. The encrypted command is decrypted on the first system using the secret key and the decrypted command is executed.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Figure 1:
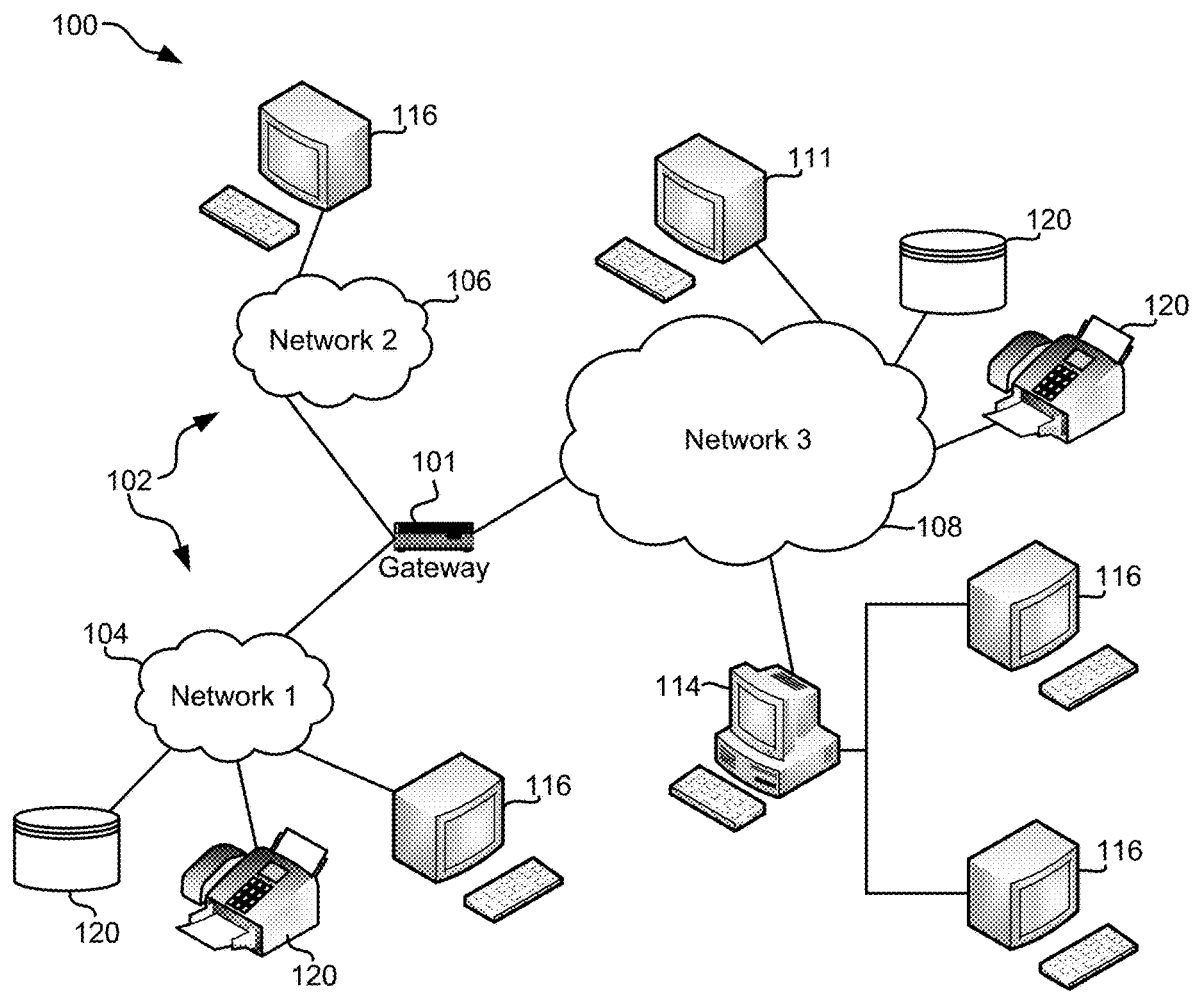
FIG. 1 is a diagram of a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
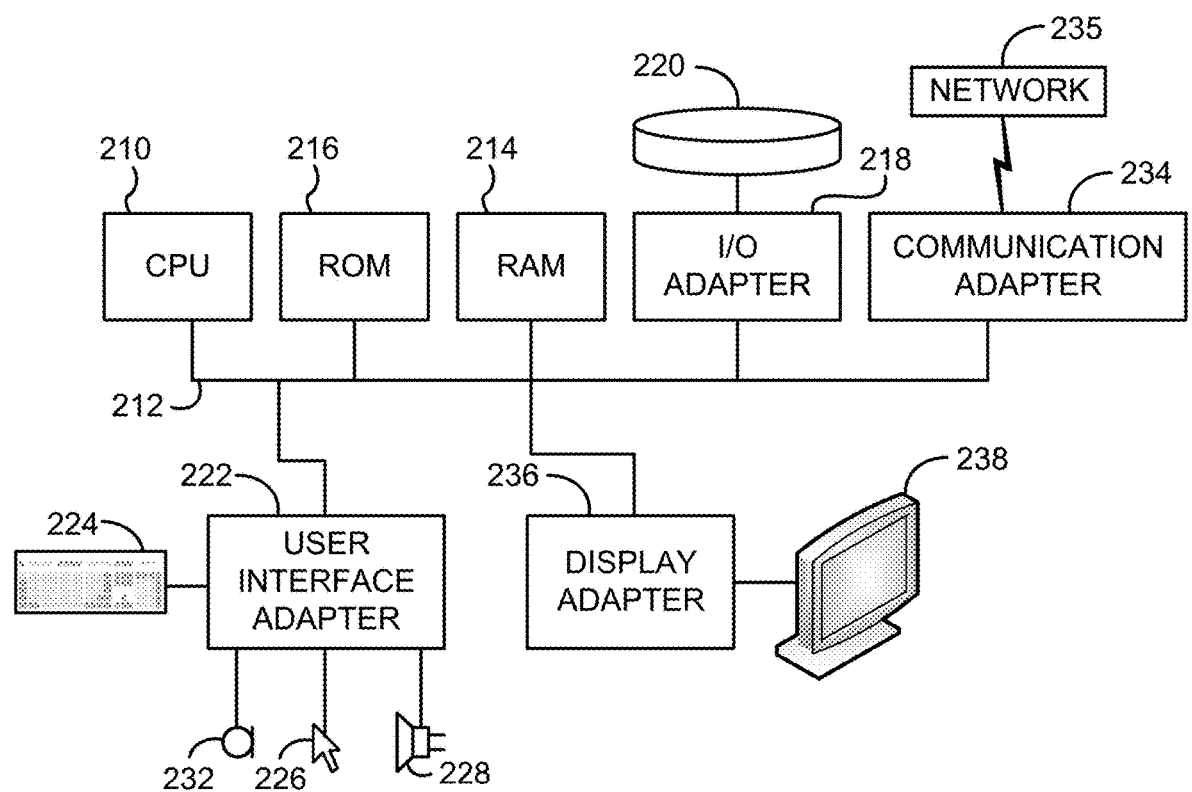
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
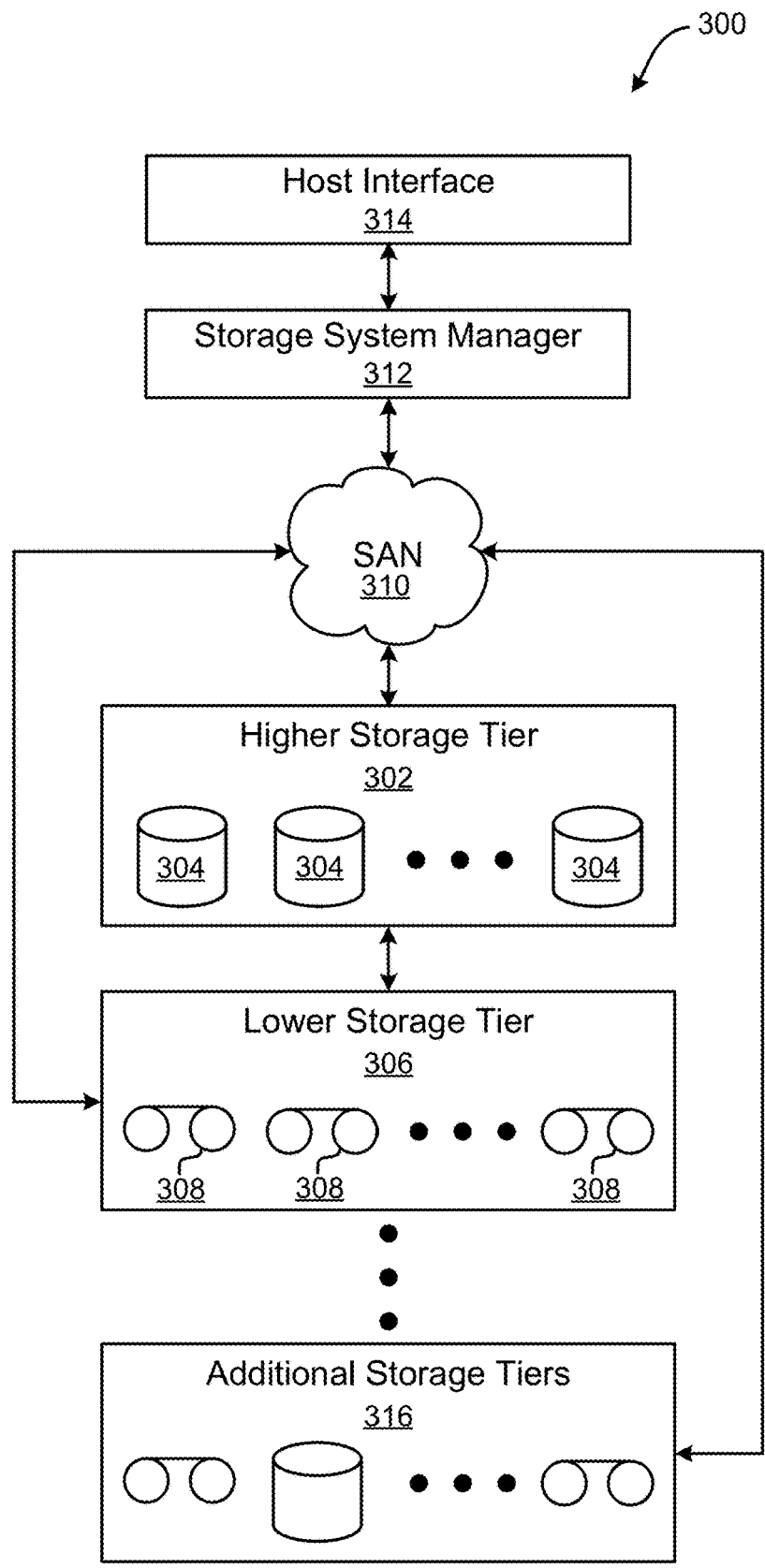
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere above, in order to ensure that information exchanged between two locations in a computing environment remains secure from being accessed by unauthorized devices, the information is often encrypted. For example, some information may be secured using cryptography. Cryptography implements a key to determine a functional output of an algorithm that is used for encrypting as well as decrypting the information.

In conventional client-server systems, a server is typically configured to receive commands from a client device and execute the commands. Moreover, client devices typically merely send commands to the server and receive a response from the server. During operation, software issues are sometimes experienced that affect the client and/or server. Accordingly, developers typically develop debugging processes to identify and resolve such issues. Moreover, debugging processes may also be developed during development of the software, and may only be intended for use during development. Accordingly, some such processes may be destructive if the commands are entered into the client device without consulting with the development team. Unfortunately, a user of a client device may elect to execute a command in an attempt to mitigate issues experienced on the client device. Premature or improper submission of a debugging command by the client device may result in damage to the client-server system. Still, these debugging commands often prove to be very effective for mitigating issues in the client-server system.

Accordingly, what is needed is a way to allow general commands to be submitted at will at the client device, but restrict the ability of a user from simply submitting commands to initiate predefined "restricted processes" from the client device at will. A restricted process can be any process specified, designated, etc. as a process that should not be initiated by a general user directly, e.g., such as a process that a developer or administrator would not want a customer running from a client machine unilaterally, e.g., a debugging process. Rather, such restricted process is one that should only be initiated at the direction of an authorized entity such as a developer, administrator, etc. who understands the effect such process will have on the client-server system.

Various embodiments and approaches described herein implement a command that is encrypted so that only an authorized entity such as the support team, development team, etc. can create commands for restricted processes such as debugging processes. The encrypted command for the restricted process may be sent to a user to enter via the client, but the user does not understand the command, as it is encrypted. Moreover, only the server holds the key to unencrypt the command, and the server discards the key after execution of the command and/or performance of the restricted process.

Various approaches described herein utilize a pair of keys, e.g., a public key and a secret key, generated by the server in a client-server system for selectively preventing a user on the client-side from submitting commands for debugging or other restricted processes at will. Specifically, the public key may be provided to a resource such as a development team that creates a debugging command. The debugging command is encrypted using the public key, and is only decryptable using the secret key that is stored on the server. Even if the user on the client-side of the network has access to the text of the encrypted debugging command, the encrypted command contents are not recognizable and/or understandable without the secret key. Moreover, because the server discards the secret key after execution of the command, the encrypted command is rendered unusable thereafter.

Note that to place aspects of the present invention in a context, much of the description herein refers to a debugging process. This has been done by way of example only, and it should be understood that the processes disclosed herein can apply to any type of command issued to the server system.

Figure 4:
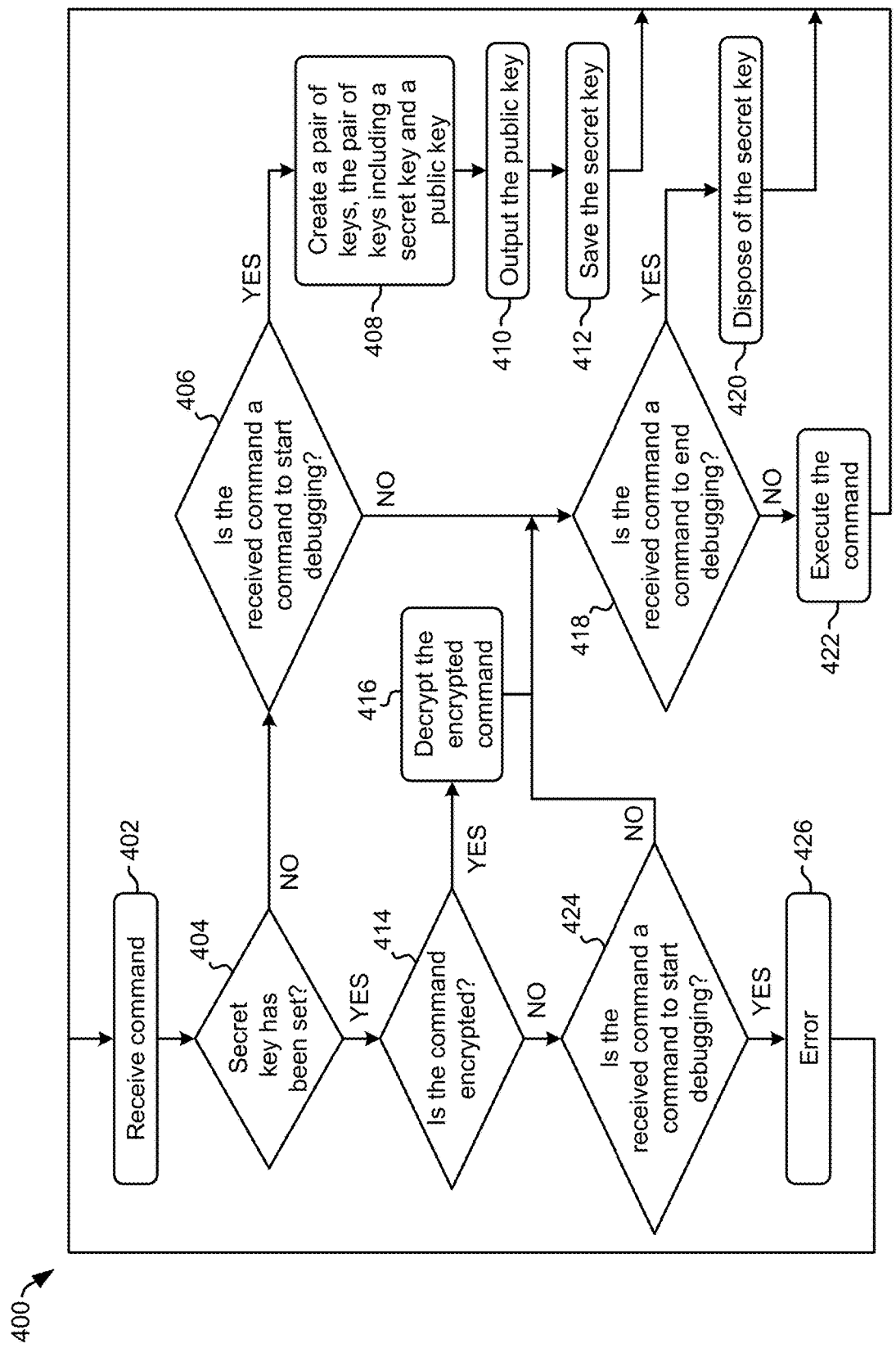
FIG. 4 is a flowchart of a method, in accordance with one embodiment.

Now referring to FIG. 4, a flowchart of a method 400 is shown according to one embodiment. The method 400 may be performed in accordance with the present invention in any of the environments depicted in FIGS. 1-3 among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that in one embodiment, one or more operations of method 400 may be performed on a first system that is on a server-side of a client-server system. In this example, the first system functions as the server on the server-side of the client-server system that is in communication with a second system that is configured as a client. To aid the reader, the first system will be referred to as a server, and the second system will be referred to as a client. As noted above, the server executes commands submitted by the client. It should be noted that some operations could potentially be implemented by other devices in the client-server system.

The server may be managed by an administrator, and moreover, the client may include one or more known type of user devices. The server and/or the client of the client-server system may in some approaches be in communication with a third system associated with an authorized entity such as a development team of software used in the server-client system. The authorized entity creates commands for prohibited processes.

With the foregoing description of a client-server system in mind, assume an issue occurs in the client-server system.

The user working on the client may want to troubleshoot the issue unilaterally, e.g., by imitating a prohibited process such as a debugging process. However, as noted above, that is not always a good idea. Accordingly, the client-server system in some approaches is configured to use a new process to initiate a prohibited process. Rather than initiate the prohibited process directly, a sequence of operations is performed to ensure that only commands to perform the prohibited process from an authorized entity are executable.

Operation 402 of method 400 includes receiving, at the server, a command to start encryption. Such command may be received from the client, e.g., as input by a user to the client.

Decision 404 determines whether a secret key has been set. In the present example, assume a secret key has not been set. The process proceeds to decision 406.

The command to start encryption is one that the server is programmed to recognize as initiating the new encryption and command submission process described herein. The command to start encryption may be an actual command requesting a start of an encryption process, in some approaches. For example, the user may recognize the command as being a command to start encryption, e.g., "ENCRYPTION START." In other approaches, the received command may be a command requesting start of a restricted process. Thus, the command to start encryption may in one or more of such approaches be an instruction to start a debugging process, e.g., see decision 406. For example, in one approach, the command to start encryption may be include a "DEBUG_START" instruction that is received by the server from the client. In further approaches, the command to start encryption may originate from a processor of the client, in response to the processor detecting operational issues, e.g., detecting a connectivity error, experiencing a decrease in performance, predicting and/or determining that a 'bug' is present in computer code utilized by the device, etc.

In response to a determination that the received command is a command to start debugging (as illustrated by the "YES" logical path of decision 406), a pair of keys may be created on the server, e.g., see operation 408 of method 400. In one preferred approach the pair of keys includes a public key and a secret key. One or both of the keys may in some approaches be created using a known technique for public key cryptography. In some other approaches, the keys may be created according another known type of encoding. As noted above, in preferred approaches, the public key is usable to encrypt data, while the data thus encrypted is only decryptable using the secret key. The public key is sent out for use in encrypting the data, while the secret key is retained by the server, and preferably never shared.

In the current example, the public key is created to thereafter be used to encode a command for a predefined restricted process, e.g., such as a debugging process. Accordingly, the public key is output, e.g., see operation 410 of method 400. In one preferred approach, the public key may be output to the client. In such an approach, the public key may be displayed to a customer or support personnel of the client, e.g., on a display screen of the client. Thus, the person who input the request to start the restricted process may be able to see, copy, forward, etc. the public key. Thereafter, the public key may be operatively sent to a third system by the client. Depending on the approach, the operative transmission of the public key from the server to the client and/or from the client to the third system may be performed using one or more known techniques, e.g., via email, via a text message, via a messaging application, verbally by the user to a development team (e.g., by reading the public key sequence from a display screen of the client into a telephone), etc.

Because the secret key is the only key usable to decrypt a command that is encrypted using the public key, the secret key may in one approach be saved on the server, e.g., see operation 412 of method 400. In some preferred approaches, the secret key may be saved to one or more secure locations of the server that are difficult or impossible for a user of a user-device of the client to access and/or find, e.g., a password protected file, a portion of the server requiring predetermined access credentials to access, an intrusion detection and/or prevention portion of the server, a portion of the server protected by a firewall, a portion of the server restricted from being accessed by remote parties, a portion of the server that is protected by a known type of hardware, saved to memory of an application of the server, etc. The client and/or users of the client preferably do not have access to the location(s) of the server at which the secret key is stored. Thus, by preventing access to the secret key, instances of premature execution of commands to perform prohibited processes are prevented. Thus, the present process avoids premature execution of a debugging command that is likely to cause damage to the client-server system. Accordingly, debugging on a user-device is made relatively safer as a result of various approaches herein restricting access to the secret key in order to prevent a command encrypted using the public key from being executed at an improper time. Note that even if the client has access to the text of the encrypted debugging command, the encrypted command contents are not recognizable and/or understandable without the secret key.

As noted above, the public key output in operation 410 is provided to an authorized entity, who creates an appropriate command for the current situation and encrypts the command using the public key via known encryption techniques. The encrypted command may be for performing a predefined restricted process, e.g., a debugging process, a system wipe and/or restart process, a shutdown process, a disaster recovery process, etc. In some approaches the restricted process may be a process that would be considered improper, e.g., improper based on such as request being predetermined to be dangerous, for a customer to request unilaterally via the server system, such as a debugging command.

The encrypted command is preferably provided to the client for submission from the client to the server, may be provided to a user of the client for input to the client for submission to the server, etc., but in other approaches may be sent directly to the server (e.g., bypassing the client), etc.

Continuing with the present example, the encrypted command is received by the server, e.g., see operation 402 of method 400. According to some illustrative approaches, the encrypted command may be received in the form it was sent to the client, e.g., as a text string, as a file, provided by a character string which has been subjected to an American Standard Code for Information Interchange (ASCII) convention such as Base64, etc.

Because the secret key was previously set in operation 408/412, the process proceeds at decision 404 to decision 414.

Because the command is encrypted, the process proceeds to operation 416, in which the encrypted command is decrypted using the secret key. As mentioned elsewhere above, upon storing the secret key on the server, access to the secret key may be restricted. Accordingly, in some approaches, decrypting the encrypted command may include first unlocking the secret key from a storage location on the server. For example, several illustrative approaches of unlocking the secret key from a storage location on the server may include, e.g., using a predetermined password, performing two-step authentication, accessing an unmarked write location of the server, etc.

The process proceeds to decision 418. Because the decrypted command is not a command to end debugging in this example (or command to end another restricted process), the process proceeds from decision 418 to operation 422, where the command is executed.

As noted above, typically, the server receives a command from a client, execute the command, and returns a result of execution of the command. This is typically the case here, where the server executes the unencrypted command, and optionally returns a result of the execution. In another approach, the server may execute the command and perform a portion of the prohibited process on the client by performing a remote access on the client. In further approaches, execution of the decrypted command may include instructing a system other than the server, e.g., such as the client, to perform the decrypted command. For example, in one or more of such approaches, the command may be at least in part executed on a system other than the server, e.g., the client, a third system, a fourth system, etc.

During a time period in which the server has the secret key stored thereon, the encrypted command is executable, provided that it is first decrypted by the server using the secret key. After executing the decrypted command, in some approaches, the server may automatically dispose of the secret key.

In another approach, after executing the decrypted command, the secret key may be retained on the server until a command to end debugging, e.g., a DEBUG_END command, is received, e.g., see the logical path proceeding through operations 402, 414, 424 to 418 upon receipt of an unencrypted command to end debugging (or equivalently a command to end another prohibited process). For context, a command to end debugging may be received by the server from a different system, e.g., from the client, from a third system, etc.

At decision 418, because the received command is recognized as a command to end debugging, the secret key is disposed of in any known manner, e.g., see operation 420. For example, depending on the approach, disposing of the secret key may include, e.g., deleting the secret key, overwriting the secret key, making a storage location at which the secret key is stored available for overwriting, etc.

In some other approaches, the secret key may be disposed of in response to a predetermined event occurring. For example, in some approaches, the secret key may be disposed of by the server according to a predetermined expiration deadline specified in, or predefined with, the command to start debugging, e.g., in response to a determination that a predetermined amount of time has passed since creation of the pair of keys. Depending on the approach, the predetermined amount of time may be set and/or adjusted by, e.g., the server, the client, a development team, etc. The secret key may in another approach be disposed of by the server in response to a determination that the received command for debugging the server is no longer an adequate debugging solution, e.g., such as in response to the server receiving a notification that indicates that a more optimal debugging solution has been determined by the third system subsequent to the server receiving the encrypted command.

It should be noted that although some approaches herein describe some encrypted commands as being debugging commands and other encrypted commands as being commands to end debugging, in some other approaches, the encrypted command may include both a command specifying when encryption is to end and a debugging command for execution. For example, in one approach, the encrypted command may include a sub-command for ending encryption, e.g., a DEBUG_END command. The sub-command may be encrypted and include a string of executable commands. In such an approach, in response to receiving the encrypted command, method 400 optionally includes executing a debugging command specified in the decrypted command, and thereafter disposing of the secret key at a time indicated in the command, e.g., such as automatically after the debugging command is executed. Accordingly, disposing of the secret key may include decrypting and executing the sub-command for ending encryption.

In another approach, the encrypted command may include any known type of information in addition to including a sub-command for ending encryption.

The present method 400 thus provides a way to ensure that only encrypted commands to perform prohibited processes are executed by the server. It is important to note that using a public key and a secret key for selectively preventing execution of commands on a device has heretofore not been utilized in conventional debugging techniques. This is because clients and/or servers typically have access to debugging commands, thereby allowing the clients and/or the servers to execute the commands upon experiencing technical issues. Accordingly, the inventive discoveries disclosed herein with regards to use of a public key and a secret key to selectively prevent execution of commands proceed contrary to conventional wisdom. Moreover, use of the public key and a secret key to selectively prevent execution of commands on a device improves an overall performance and longevity of the device. This is because the device is prevented from prematurely executing debugging commands, which might otherwise cause damage to the device.

The present method 400 also enables performance of normal commands, e.g., commands to perform non-prohibited processes, whether or not a command to start debugging or other prohibited process has been received. For example, upon receipt at the server of a command to perform a non-prohibited process from the client at operation 402, a determination is made as to whether the secret key has been set. See decision 404. If the secret key has not been set, the process proceeds through operations 406 and 418 to operation 422, where the command is executed. If, on the other hand, the secret key has been set, the process proceeds through operations 406, 414, 424 and 418 to operation 422, where the command is executed.

Referring again to operation 402, if a command to start a prohibited process such as debugging is received by the server, and a secret key has already been set, the logic of method 400 prevents duplicate performance of the prohibited process. Particularly, processing of such unencrypted command to start the prohibited process proceeds through operations 404, 414 to 424. At decision 424, the command is recognized as a command to start the prohibited process (as illustrated by the "YES" logical path of decision 424) and an error is created, e.g., see operation 426.

In response to a determination that the received command is not a command to start debugging (as illustrated by the "NO" logical path of decision 406), method 400 may continue to decision 418.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, at a first system, a command to start encryption;
in response to receiving the command to start encryption, creating, on the first system, a pair of keys, wherein the pair of keys includes a public key and a secret key;
outputting the public key to a second system;
saving the secret key on the first system;
receiving, by the first system, a command encrypted using the public key;
decrypting, on the first system, the encrypted command using the secret key; and
executing the decrypted command,
wherein the encrypted command includes a sub-command for ending encryption and comprising: in response to receiving the encrypted command, disposing of the secret key, wherein the disposing includes decrypting and executing the sub-command.

2. The computer-implemented method of claim 1, wherein the encrypted command is for performing a restricted process.

3. The computer-implemented method of claim 1, wherein the encrypted command is received from the second system.

4. The computer-implemented method of claim 1, wherein the encrypted command is received from the second system, wherein the encrypted command was previously encrypted by a third system that sent the encrypted command to the second system.

5. The computer-implemented method of claim 1, comprising: accessing the secret key on the first system in response to receiving the command, wherein accessing the secret key includes unlocking the secret key from an unmarked write location on the first system.

6. The computer-implemented method of claim 1, wherein the decrypted command is a debugging command.

7. The computer-implemented method of claim 1, comprising: disposing of the secret key in response to a predetermined amount of time passing after the pair of keys being created.

8. A computer program product, the computer program product comprising a computer readable storage medium having program instructions embodied therewith, the program instructions readable and/or executable by a computer to cause the computer to:
receive, by the computer, at a first system, a command to start encryption;
in response to receiving the command to start encryption, create, by the computer, on the first system, a pair of keys, wherein the pair of keys includes a public key and a secret key;
output, by the computer, the public key to a second system;
save, by the computer, the secret key on the first system;
receive, by the computer, by the first system, a command encrypted using the public key;
decrypt, by the computer, on the first system, the encrypted command using the secret key; and
cause, by the computer, the decrypted command to be executed on a third system.

9. The computer program product of claim 8, wherein the encrypted command is for performing a restricted process.

10. The computer program product of claim 9, wherein the encrypted command is received from the second system.

11. The computer program product of claim 8, wherein the encrypted command is received from the second system, wherein the encrypted command was previously encrypted by a third system that sent the encrypted command to the second system.

12. The computer program product of claim 8, the program instructions readable and/or executable by the computer to cause the computer to: dispose of, by the computer, the secret key in response to receiving, on the first system, a command for ending encryption.

13. The computer program product of claim 8, wherein the encrypted command includes a sub-command for ending encryption and the program instructions readable and/or executable by the computer to cause the computer to: dispose of, by the computer, the secret key, in response to receiving the encrypted command, wherein the disposing includes decrypting and executing the sub-command.

14. The computer program product of claim 8, wherein the command to start encryption is received from a client device of the third system, wherein causing the decrypted command to be executed on the third system includes: performing, by a remote access, a portion of a prohibited process on the client device.

15. The computer program product of claim 8, wherein the decrypted command is a debugging command.

16. The computer program product of claim 8, the program instructions readable and/or executable by the computer to cause the computer to: dispose of, by the computer, the secret key in response to a predetermined amount of time passing after the pair of keys being created.

17. A system, comprising:
a processor; and
logic integrated with the processor, executable by the processor, or integrated with and executable by the processor, the logic being configured to:

receive, at a first system, a command to start encryption;
in response to receiving the command to start encryption, create, on the first system, a pair of keys, wherein the pair of keys includes a public key and a secret key;
output the public key to a second system;
save the secret key on the first system;
receive, by the first system, a command encrypted using the public key;
decrypt, on the first system, the encrypted command using the secret key;
execute, by the first system, the decrypted command on a third system; and
automatically dispose of the secret key subsequent to executing the decrypted command.

18. The system of claim 17, wherein the encrypted command is for performing a debugging process, wherein the executing the decrypted command includes performing, by the first system, a remote access on the third system.

\* \* \* \* \*